UNITED STATES PATENT OFFICE.

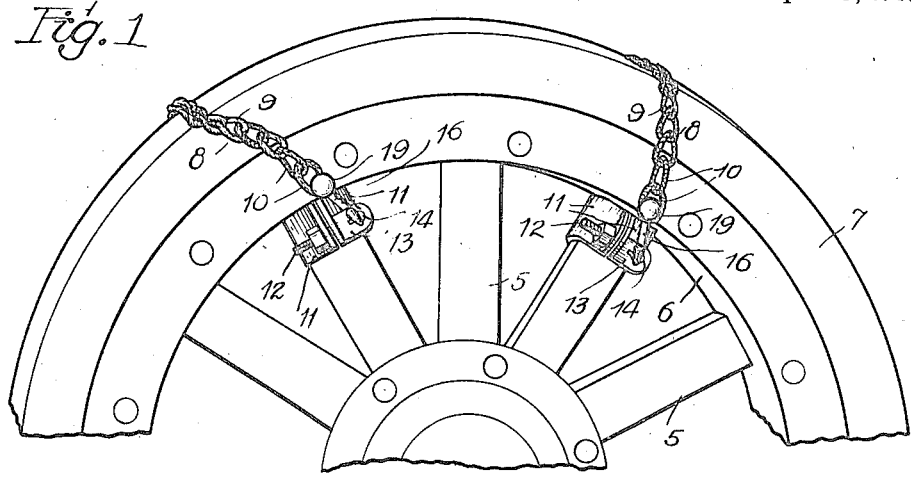
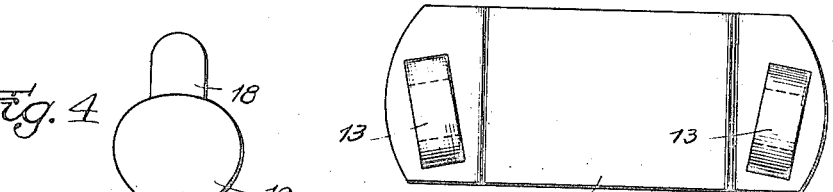

WILLIAM H. KRUG, OF OSHKOSH, WISCONSIN.

COUPLING FOR ANTISKID-CHAINS.

1,302,470. Specification of Letters Patent. Patented Apr. 29, 1919.

Application filed March 29, 1918. Serial No. 225,413.

*To all whom it may concern:*

Be it known that I, WILLIAM H. KRUG, a citizen of the United States, residing at Oshkosh, in the county of Winnebago and State of Wisconsin, have invented a certain new and useful Improvement in Couplings for Antiskid-Chains, of which the following is a full, clear, concise, and exact description, reference being had to the accompanying drawings, forming a part of this specification.

My invention relates to improvements in couplings for anti-skid chains adapted to be used upon the wheels of motor vehicles and the like, and is especially concerned with means which will enable the anti-skid chains to be quickly and easily attached to, or detached from the motor vehicle.

In my co-pending application, Serial No. 181,285, filed July 18, 1917, I have described as a part of the means for securing an anti-skid chain to a wheel, a coupling member which comprises a shank having the ends thereof reversely curved upon itself, one of said ends being provided with a cross head which is inserted through a keyhole slot in a second coupling member. In the operation of this coupling member the cross head provides means for preventing the separation of the two coupling members. In operation this device has proved very satisfactory as long as the skid chains are not worn through. When, however, the skid chains become worn through or broken, it has been found that occasionally one of the coupling members secured to one of the ends of the broken chain is jarred by the motion of the vehicle in such a manner as to become detached from the coupling member secured to the wheel and consequently is lost.

The object of the present invention is to provide a coupling member adapted to be secured to the ends of skid chains, and to co-act with a second coupling member secured to the wheel, the construction of the two coupling members being such that the chains may be very easily and quickly attached to and detached from the wheel, and of such construction that there is very little possibility of the coupling members attached to the chain being lost in the event of the chain becoming worn or broken in two.

These objects are accomplished by means of the structure illustrated in the accompanying drawings, in which Figure 1 is a perspective view of a fragment of a vehicle wheel, of the type employing solid tires, equipped with anti-skid chains secured to the wheels by means of my improved coupling;

Fig. 2 is a side elevation of one of the clamping members used to secure the ends of the chains to the wheel;

Fig. 3 is a view showing one of the coupling members of my improved coupling in side elevation and a portion of the other of said members in longitudinal section on line 3—3 of Fig. 4, the first mentioned coupling member being shown in dotted outline in the position it must occupy before the two members can be detached from each other, and Fig. 4 is a side elevation of the two coupling members interlocked, the one coupling member being shown in the position which it occupies in dotted outline in Fig. 3.

Similar characters of reference refer to similar parts throughout the several views.

Referring to the drawings, the reference characters 5, 6 and 7 indicate the spokes, felly and tire, respectively, of the motor vehicle wheel, the details of the construction of which, form no part of the present invention. Reference characters 8 indicate anti-skid chains comprising twisted links 9, the last two links 10, at each end of these ends preferably being straight links to permit adjustment of the length of the chain.

The means for securing the chains to the wheel I have illustrated as comprising a pair of clamps 11, which are clamped about alternate spokes of the wheel by means of bolts 12, having elongated heads 13 provided with keyhole slots 14. The shank of the bolt 12 is provided adjacent the head 13 with a polygonal enlargement 15, which is received in corresponding apertures in the clamping members 11, to prevent rotation of the bolt in these clamping members. The apertures in the clamping members are so positioned that the heads 13 of the bolts 12 are inclined toward each other as shown in Fig. 2.

The structure thus far described, so far as the details thereof are concerned, forms no part of my present invention except in so far as the specific structure of the head of bolt 13, which, for the purpose of convenience, will be termed the coupling member, co-acts with the coupling member about to be described. This coupling member comprises a shank portion 16 which is bowed inwardly intermediate its ends, and the ends 17 and 18 are reversely curved upon the shank portion. The reversely curved end 18 is provided with a flattened head 19, which, when the opposite end of the coupling member is inserted through one of the straight links 10 of the chains 9, co-acts with the sides of these links to prevent the end 18 from becoming disengaged from the links 10.

The reversely curved end 17 is provided with an elongated head 20, comprising the oppositely extending inner and outer lugs 21 and 22 respectively, which are inclined inwardly toward the shank 16 as shown in Fig. 3. The end of the head 20, formed by the lug 21, diminishes in width toward the end thereof so that it will just pass through the straight portion 23 of the keyhole slot when brought into the position shown in Fig. 4 in full outline, and in Fig. 3 in dotted outline. Referring to Fig. 3 and to that portion thereof which discloses the one coupling member in dotted outline, it will be noted that the distance between the point $a$ and the point $b$ is just slightly smaller than the length of the keyhole slot, that is, the distance between the points $c$ and $d$. When this coupling member is brought to this position, it can be detached from the other coupling member by rocking it about the rounded portion 24 of the other coupling member in the direction of the small arrow, until the head 20 occupies a position substantially at right angles to the position shown in dotted outline, and then moving the coupling member bodily in an upward direction until the rounded portion 24 is opposite the space between the two heads 19 and 20. By then moving the coupling members laterally relative to each other, they will become completely separated.

Referring to that portion of the coupling member which is shown in full lines in Fig. 3, it will be noted that the distance between the point $a$ and end point $e$ on the inner side of the reversely curved end 17, which lies nearer to shank 16 than the point $b$, is greater than the distance between the point $c$ and $d$, that is, greater than the length of the keyhole slot; consequently, it is impossible to separate the two members except when the one coupling member is brought into the position indicated in dotted outline in Fig. 3. From the above it will be clear that in order to separate the two members, it is first necessary to bring the one coupling member into the position indicated in dotted outline in Fig. 3, with the axis of the head 20 in alinement with the longest axis of the keyhole slot 14, then rotate this coupling member about the rounded portion 24, then move it bodily upward until the rounded portion 24 of the other coupling member is opposite the space between the two heads 19 and 20, and to then move the two members laterally relatively to each other. It is thought to be unnecessary to point out that there is but very little probability of the two coupling members ever being accidentally moved to the different positions just described, and in the proper sequence, to disconnect the two coupling members, and that, consequently, even though the anti-skid chains do become broken in two, there is no danger of the coupling members attached to the ends of the chains becoming detached from the coupling members attached to the wheels.

While I have described the preferred embodiment of my invention, it is to be understood that it is capable of other adaptations and modifications within the scope of the following claims.

Having thus described my invention, what I claim and desire to secure by Letters Patent of the United States is:

1. The combination with a coupling member provided with a keyhole slot, of a second coupling member comprising a shank having the ends thereof reversely curved upon the same side of shank, one of said ends being provided with a head, the other of said ends being provided with a second head comprising inner and outer oppositely extending lugs lying in the plane of the shank, and inclined inwardly toward said shank, the distance from the free end of said outer lug to the inner side of said reversely curved end adjacent said inner lug being substantially equal to the length of said slot, and the distances from the free end of said outer lug to points on the inner side of said reversely curved end nearer said shank being greater than the length of said slot.

2. The combination with a coupling member provided with a slot, of a second coupling member comprising a shank having the ends thereof reversely curved upon the same side of the shank; one of said ends being provided with a head, the other of said ends being provided with a second head comprising inner and outer oppositely extending lugs lying in the plane of the shank, the distance from the free end of said outer lug to the inner side of said reversely curved end adjacent said inner lug being substantially equal to the length of said slot, and the distances from the free end of said outer lug to points on the inner side of said reversely curved end nearer said shank being greater than the length of said slot.

3. The combination with a coupling member provided with a slot, of a second coupling member comprising a shank provided with a reversely curved end having an elongated head lying in the plane of said shank, the distance from the outer end of said head to the inner side of said reversely curved end at a point adjacent the inner end of said head being substantially equal to the length of said slot, and the distances from the outer end of said head to points on the inner side of said reversely curved end nearer said shank being greater than the length of said head.

4. The combination with a coupling member having a slot, of a second coupling member comprising a shank having one end bent at an angle thereto, and provided with an elongated head lying in the plane of said shank, the distance from one end of said head to the opposite side of said end at a point adjacent the other end of said head being substantially equal to the length of said slot, but to other points on said end nearer said shank being greater than the length of said slot.

5. A coupling member comprising a shank portion having both ends bent at an angle thereto, and lying in the same plane, one of said ends being provided with an elongated head, the distance from one end of said head to the opposite side of said end being greater than the distance from the other end of said head to the other side of said end.

6. A coupling member comprising a shank having one end bent at an angle thereto and provided with an elongated head lying in the plane of said shank, the distance from one end of said head to the opposite side of said end being greater than the distance from the other end of said head to the other side of said end, and means for connecting the other end of said shank with a chain.

7. A coupling member comprising a shank having a reversely curved end provided with a laterally extending portion provided with an elongated head lying in the plane of said shank, and extending unequal distances from said laterally extending portion, and means for connecting the other end of said shank with a chain.

8. A coupling member comprising a shank having both ends reversely curved upon the same side thereof, and lying in the plane of said shank, one of said ends being provided with a flattened head, and the other of said ends being provided with an elongated head, comprising oppositely disposed inner and outer lugs, the outer lug diminishing in width toward the end thereof.

9. A coupling member comprising a shank having one end thereof reversely curved thereon and provided with a head comprising oppositely extending inner and outer lugs, the outer lug diminishing in width toward the outer end thereof, and means for connecting the other end of said shank with a chain.

10. A coupling member comprising a shank having a laterally extending end provided with a head projecting from both sides of said laterally projecting end and lying substantially in the plane of said shank, and means for connecting the other end of said shank with a chain.

In witness whereof, I hereunto subscribe my name this 21st day of March, 1918.

WM. H. KRUG.

Witnesses:
H. M. JOHNSON,
R. W. LUTZ.